United States Patent [19]

Levy

[11] 4,287,528

[45] Sep. 1, 1981

[54] TELEVISION SYSTEM

[76] Inventor: Paul M. Levy, 3 Butternut Ct., Dix Hills, N.Y. 11746

[21] Appl. No.: 124,927

[22] Filed: Feb. 26, 1980

Related U.S. Application Data

[63] Continuation-in-part of Ser. No. 59,322, Jul. 20, 1979, which is a continuation-in-part of Ser. No. 20,874, Mar. 15, 1979, abandoned.

[51] Int. Cl.³ .............................................. H04N 9/60
[52] U.S. Cl. ........................................ 358/3; 358/88; 358/142; 358/146
[58] Field of Search ............... 358/3, 88, 91, 92, 142, 358/146, 11, 12; 179/15 BY

[56] References Cited

U.S. PATENT DOCUMENTS

| | | | |
|---|---|---|---|
| 3,061,669 | 10/1962 | Leek | 358/142 |
| 3,488,435 | 1/1970 | Eilenberger | 358/188 |
| 3,637,926 | 1/1972 | Morchand | 358/3 |
| 3,697,675 | 10/1972 | Beard | 358/3 |
| 3,700,793 | 10/1972 | Borsuk | 358/142 |
| 3,896,487 | 7/1975 | Tesler | 358/3 |
| 3,991,266 | 11/1976 | Baer | 358/146 |
| 4,027,333 | 5/1977 | Kaiser | 358/146 |

*Primary Examiner*—Marc E. Bookbinder
*Assistant Examiner*—Michael A. Masinick

*Attorney, Agent, or Firm*—Morgan, Finnegan, Pine, Foley & Lee

[57] ABSTRACT

A compatible television system which provides means for encoding two video sources of color television picture information, comprising an independent or stereoscopic pair of real-time images, is disclosed. A first video source provides a first video signal, and a second video source provides a second video signal in time synchronism with the first video signal.

The encoding process provides a composite video signal such that a standard television receiver will render the imagery corresponding to the first video source. A non-standard television receiver, i.e., one with means for decoding the second video signal, will render the imagery corresponding to the second video source and/or the imagery corresponding to the first video source. The means for rendering the imagery corresponding to the first video source is provided by a standard video channel as in the standard television receiver, and requires no decoder.

The encoded video signal information may be transmitted to the receiver by means of a standard broadcast channel, a closed circuit channel, video recording and subsequent playback or any sequence of the preceding methods.

In addition, means for decoding the second video signal, as required by the non-standard television receiver, are disclosed.

21 Claims, 5 Drawing Figures

FIG. 5

TELEVISION SYSTEM

BACKGROUND OF THE INVENTION

This is a continuation-in-part of U.S. patent application Ser. No. 059,322, filed July 20, 1979, which in turn is a continuation-in-part of U.S. patent application Ser. No. 020,874, filed Mar. 15, 1979, now abandoned.

In The above-referenced copending applications, three preferred methods of performing the encoding and corresponding decoding functions are disclosed. The present application discloses an improvement of the Repeat Merged Frame Method described in the cited copending applications by providing better masking of the second video source in the imagery of the first video source as rendered by a standard television receiver. This is achieved by the encoder which alternates the polarity of the amplitude scaled second video signal at the line rate rather than the frame rate, thereby minimizing the flicker effect associated with frame rate polarity alternation. This improved Repeat Merged Frame Method is designated as the Repeat Merged Frame/Alternate Line Method. In addition, a Repeat Merged Field Method is disclosed. This method, which is similar to the Repeat Merged Frame Method, merges and repeats consecutive fields rather than consecutive frames of the first video source, while alternating the polarity of the amplitude scaled second video signal at the field rate rather than the frame rate, thus providing improved temporal resolution of the rendered imagery.

This invention relates to an improved television system. More specifically, it relates to a television system which provides several methods of encoding two video sources of real-time color television images, which may be either independent or stereoscopic pairs, for transmission over a standard television broadcast channel, or transfer over a closed circuit channel. The encoding methods provide compatibility with standard receivers which render the imagery corresponding to the first video source. The system also provides several methods of decoding the second video signal as required by the non-standard television receiver.

Stereoscopic television is currently used in industry, education, medicine, and other fields to provide a three-dimensional display of a live or recorded scene which is remote from the viewer's field of view. These currently used systems are closed circuit systems usually requiring two transmission channels, each having the bandwidth of a standard television channel.

A method for encoding and decoding a stereoscopic pair of color video signals transmitted over a standard television broadcast channel is described in U.S. Pat. No. 3,896,487.

According to the invention, the luminance component of the second image of the stereo pair is employed for effecting an additional amplitude modulation of the chrominance subcarrier of the first image, while the chrominance component of the second image of the stereo pair is employed for effecting an additional quadrature modulation of the chrominance subcarrier of the first image by means of a second subcarrier.

As pointed out in the patent, a disadvantage of this method of coding the chrominance component of the second image, is the sensitivity of the color subcarrier signals to distortions of the differential phase type inherent in the NTSC method, as well as to parasitic suppression of one sideband of the modulated signal. It is further shown in the patent, that the encoding methods provide compatibility only with standard monochrome television receivers, and not with standard color television receivers.

It is believed that prior to the present invention, there has not been available a compatible television system having means for encoding two video sources of color television picture information, comprising an independent or stereoscopic pair of real-time images, for transmission over a standard television broadcast channel, and having means for recovering the two video source signals for display. The attributes of such a system are apparent. They include the capability of conveying and rendering two real-time color television pictures by means of a standard broadcast channel while maintaining compatibility with standard monochrome and color television receivers. Thus, the need for such a system has gone unfulfilled.

It is accordingly a general object of the present invention to overcome the aforementioned limitations and drawbacks associated with known encoding and decoding methods and to fulfill the needs mentioned by providing a television system having all of the desirable attributes noted above.

It is a particular object of the invention to provide an improved television system.

It is a further object of the invention to provide a television system utilizing techniques of encoding two video signals to produce a composite transmission which is compatible with existing monochrome and color television receivers.

Another object of the invention is to provide a television system utilizing decoding techniques which permit individual or simultaneous display of the encoded video signals.

It is still another object of the invention to allow for conversion of the two video signals comprising a stereoscopic pair into a format for time sequential presentation of stereoscopic imagery on a single display device, as disclosed in the above-referenced copending applications.

Other objects will be apparent in the following detailed description and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a television system comprising: means for providing a first video signal; means for providing a second video signal in time synchronism with said first video signal; encoding means for forming a composite video signal of said first video signal and said second video signal, said encoding means including means for amplitude scaling said first video signal and said second video signal; means for transmitting said composite video signal to means for receiving said composite video signal, said receiving means including means for decoding said second video signal from said received composite video signal, said decoding means including means for amplitude scaling said received composite video signal.

BRIEF DESCRIPTION OF THE DRAWINGS

Serving to illustrate exemplary embodiments of the invention are the drawings of which:

FIG. 5 is a timing diagram for the alternate embodiments of the video encoder and video decoder.

Figure 5:
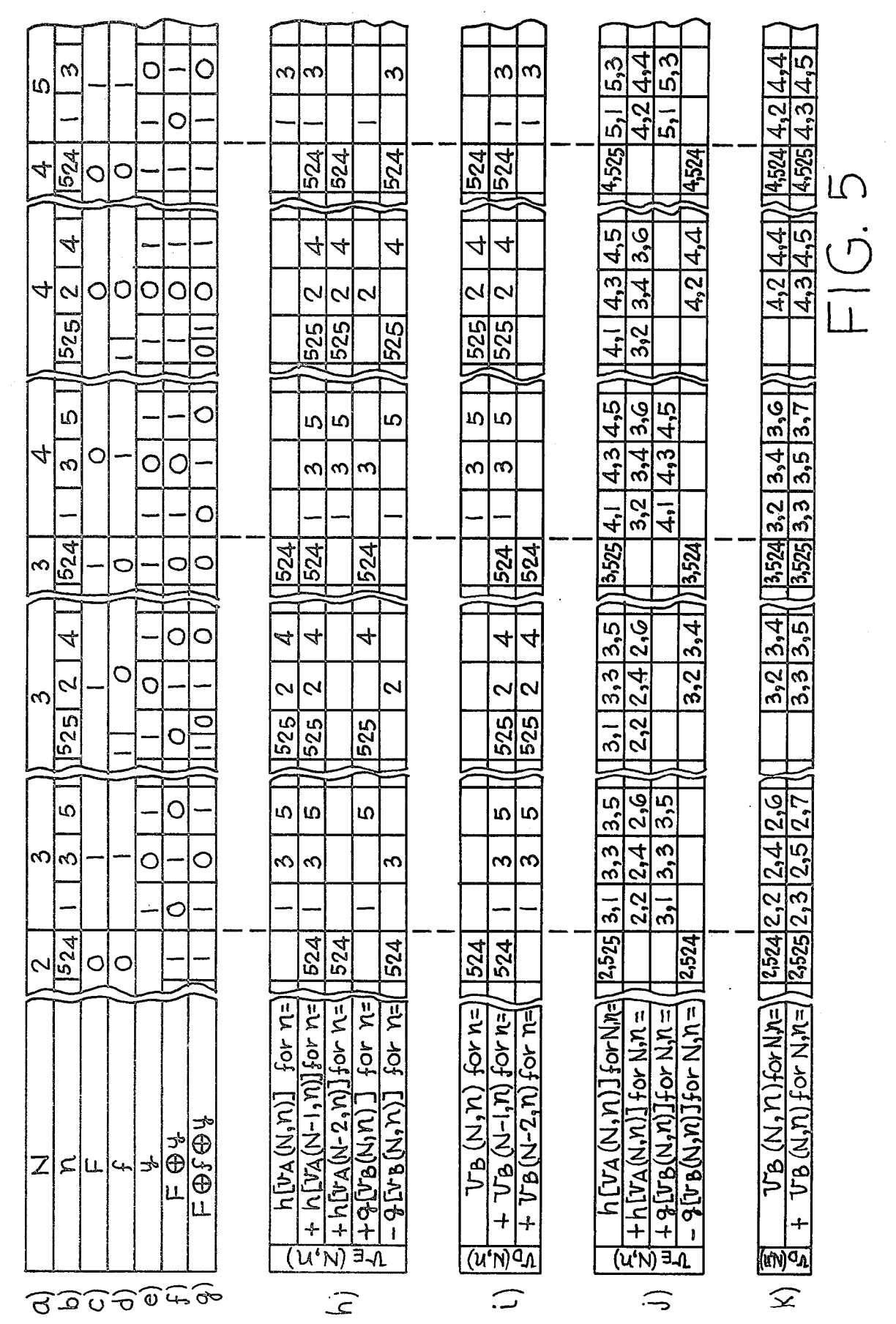
Figure 1:
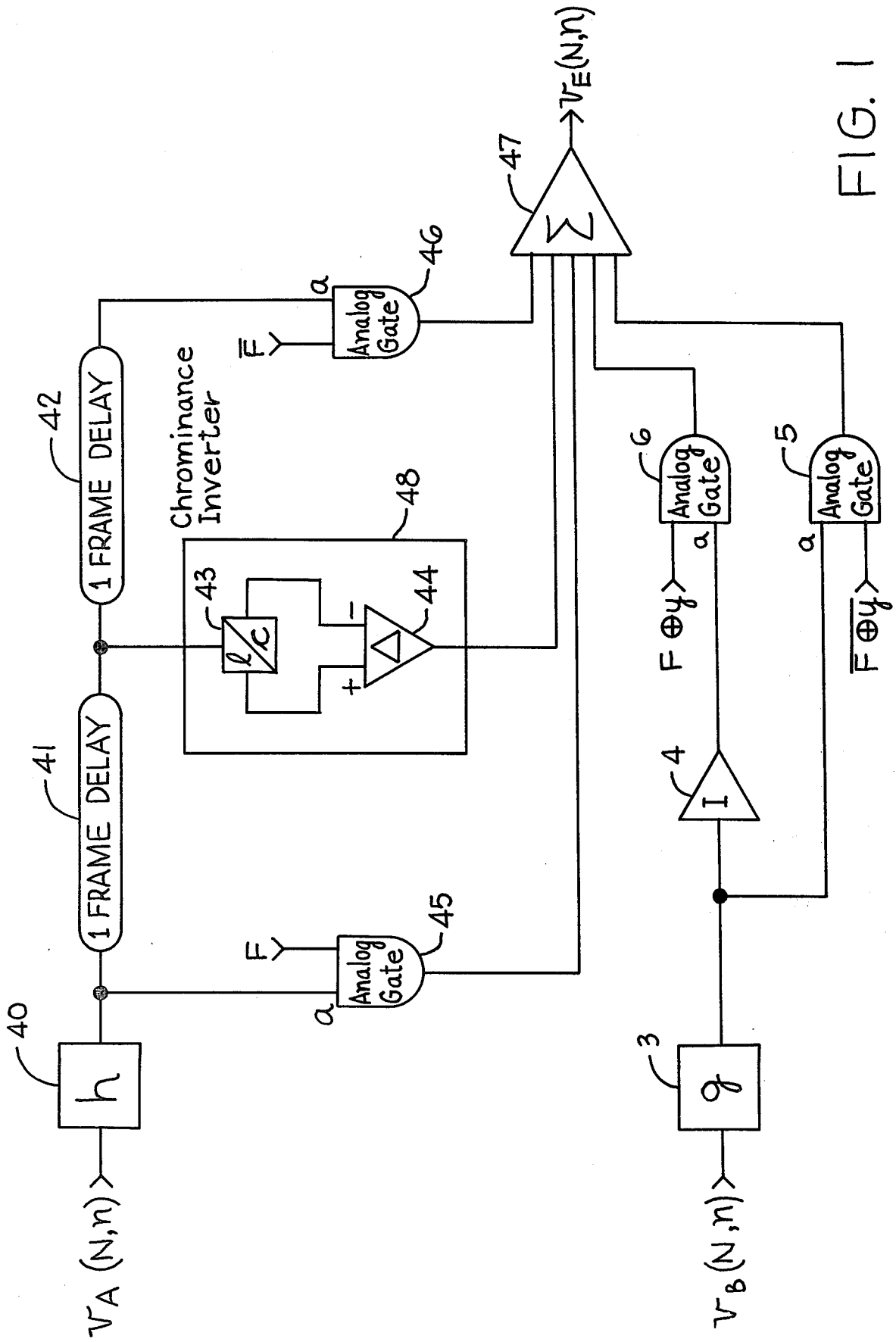
FIG. 1 is a block diagram of the video encoder utilized in the Repeat Merged Frame/Alternate Line method.

DESCRIPTION OF PREFERRED EMBODIMENT in order to understand the symbolic representation of the encoding and decoding functions that form part of this description, and their schematic embodiments, it will be helpful to refer to the timing diagrams shown in FIG. 5.

In FIG. 5a, N represents the current television frame number of the video source, where sequential frames are consecutively numbered.

FIG. 5b shows the current television line number, n, of the video source.

In FIG. 5c, F is a derived binary logic signal indicating an odd or an even current frame number, where $F=1$ represents an odd number and $F=0$ represents an even number. In FIG. 5d, f is a derived binary logic signal indicating an odd or an even current television field of the video source where $f=1$ represents an odd field comprised of odd numbered television lines, and $f=0$ represents an even field comprised of even numbered television lines.

It is seen that the odd field comprises the set of consecutive odd numbered television lines and the even field comprises the set of intervening consecutive even numbered television lines.

In FIG. 5e, y is a derived binary logic signal which is preset at the beginning of a frame, and toggles from line to line.

In FIG. 5f, $F \oplus y$ is a derived binary logic signal which represents the logical Exclusive OR function of F and y.

In FIG. 5g, $F \oplus f \oplus y$ is a derived binary logic signal which represents the logical Exclusive OR function of F and f and y.

Other logical functions such as AND, OR and NEGATION are represented by the symbols ·, + and —, respectively.

The derived binary logic signals described above are formed by currently used techniques, however, in order to derive the F signal at the receiver, it is necessary to transmit an odd numbered frame synchronizing signal, in addition to the standard synchronizing signals, to uniquely tag odd numbered frames. This synchronizing signal may conveniently be transmitted during the vertical retrace of alternate frames. Methods of inserting this additional synchronizing signal at the transmitter and recovering it at the receiver are not addressed since they are well known by those skilled in the art.

In order to afford a complete understanding of the invention and an appreciation of its advantages, a description of several alternate embodiments is presented below.

ENCODING AND DECODING METHODS

Two alternative and preferred methods of performing the encoding and corresponding decoding functions are disclosed. These methods are, the Repeat Merged Frame/Alternate Line Method, and the Repeat Merged Field Method. The first method is a variant of the Repeat Merged Frame Method disclosed in the cited co-pending applications. Its advantage is masking the second video source in the imagery rendered by a standard television receiver is provided by the encoder, which alternates the polarity of the amplitude scaled second video signal at the line rate rather than the frame rate. In the second method, which is similar to the Repeat Merged Frame Method; the encoder merges and repeats consecutive fields of the first video source rather than consecutive frames, and alternates the polarity of the amplitude scaled second video signal at the field rate rather than the frame rate.

Those functions as may be required for transmission, reception, synchronization, black level insertion and methods for the display of the rendered video imagery are not addressed since they are well known by those skilled in the art. However, it is noted that in the exemplary embodiment of the invention, the encoded video signal information may be transmitted to the receiver by means of a standard broadcast channel, a closed circuit channel, video recording and subsequent playback or any sequence of the preceding methods.

The encoding process provides a composite video signal such that a standard television receiver will render the imagery corresponding to the first video source. A non-standard television receiver, i.e., one with means for decoding the second video signal, will render the imagery corresponding to the second video source and/or the imagery corresponding to the first video source. The means for rendering the imagery corresponding to the first video source is provided by a standard video channel as in the standard television receiver, and requires no decoder.

I. THE REPEAT MERGED FRAME/ALTERNATE LINE METHOD (a) Encoding

The first video signal component is formed, during an odd numbered frame, by summing the first video signal, amplitude scaled by a first factor, h, corresponding to the current frame, and the similarly scaled first video signal corresponding to the preceding frame, with its chrominance component inverted, to form a merged frame, while during the succeeding even numbered frame, this previously formed merged frame is repeated with interchanged chrominance inverted components.

The second video signal component is formed, by scaling the amplitude of the second video signal by a second scaling factor, g, which is smaller than the first factor, and then alternating the polarity of the resultant at the line rate.

The encoded video signal comprises the video sum of the first and second video signal components.

The encoding function for the Repeat Merged Frame/Alternate Line Method may be written as:

$$V_E(N,n) = h[V_A^*(N - 1,n)] \qquad (1)$$
$$+ h[V_A(N,n)] \cdot [F]$$
$$+ h[V_A(N - 2,n)] \cdot [\overline{F}]$$
$$+ g[V_B(N,n)] \cdot [\overline{F \oplus y}]$$
$$- g[V_B(N,n)] \cdot [F \oplus y]$$

*Indicates inverted chrominance component where:

N≡Current frame number
n≡Current line number
h≡First scaling factor (a constant term)
g≡Second scaling factor (a constant term or a non-linear term; g<h)
$V_A(N,n)$≡First video signal corresponding to frame N, line n
$V_B(N,n)$≡Second video signal corresponding to frame N, line n
$V_E(N,n)$≡Encoded video signal corresponding to frame N, line n The resulting encoded signal is shown as a function of time in FIG. 5h.

The encoder implementation is shown in FIG. 1. As shown therein, the first video signal, $V_A(N,n)$, is applied to Attenuator 40 with transfer function, h, to provide a first component, $h[V_A(N,n)]$. This component is also delayed for one frame time by Frame Delay Unit 41 to provide the signal, $h[V_A(N-1,n)]$, which is applied to Chrominance Inverter 48 (comprising for example Chrominance/Luminance splitter 73 and Analog Difference Amplifier 74) and Frame Delay Unit 42. The output signal of Chrominance Inverter 48 provides a second component, $h[V_A^*(N-1,n)]$, and the output of Frame Delay Unit 42 provides a third component, $h[V_A(N-2,n)]$.

The first and third components are time multiplexed by their associated Analog Gates 45 and 46, under control of signals F and $\bar{F}$, respectively, into Analog Summing Amplifier 47. The second component provides a third input to Analog Summing Amplifier 47. It is the sum of these three components that comprise the first video component of the encoded video signal. The second video signal, $V_B(N,n)$, is applied to Attenuator 3 with transfer function g to provide the signal, $g[V_B(N,n)]$. The resulting signal, $g[V_B(N,n)]$, is applied to Video Inverter 4, to provide its inverse signal $-g[V_B(N,n)]$. These latter two signals are then gated by Analog Gates 6 and 5 (the analog input is denoted by "a"), to provide the requisite alternating polarity signal, comprising the second component of the encoded video signal, to Analog Summing Amplifier 2. The gating signals, F⊕y and $\overline{F⊕y}$ provide the polarity switching function.

The output of Analog Summing Amplifier 47 is the encoded video signal corresponding to the encoding function described by equation (1).

A standard television receiver, or the standard video channel of a non-standard receiver, receiving this encoded composite video signal, will render the imagery corresponding essentially to the first video signal.

(b) Decoding

The second video signal is extracted from the encoded composite video signal by forming, during even numbered frames, the absolute difference between the currently arriving encoded video signal, scaled by the scaling inverse of the encoder's second scaling factor, $g^{-1}$, and the similarly scaled encoded video signal which arrived one frame earlier with its chrominance component inverted; and forming during odd numbered frames, the absolute difference between the similarly scaled encoded video signal which arrived two frames earlier, and the similarly scaled encoded video signal which arrived one frame earlier, with its chrominance component inverted.

The decoding function for the Repeat Merged Frame/Alternate Line Method may be written as:

$$V_D(N,n) = [g^{-1}[V_E(N-2,n)] - g^{-1}[V_E^*(N-1,n)]] \cdot [F \cdot y] \quad (2)$$
$$+ [g^{-1}[V_E^*(N-1,n)] - g^{-1}[V_E(N-2,n)]] \cdot [\bar{F} \cdot y]$$
$$+ [g^{-1}[V_E^*(N-1,n)] - g^{-1}[V_E(N,n)]] \cdot [F \cdot \bar{y}]$$
$$+ [g^{-1}[V_E(N,n)] - g^{-1}[V_E^*(N-1,n)]] \cdot [\bar{F} \cdot \bar{y}]$$

The resulting video signal that is displayed on a non-standard television receiver is found by performing the specified decoding function on the encoded video signal. The result may be expressed as:

$$V_D(N,n) = V_B^*(N-1,n) \quad (3)$$
$$+ V_B(N-2,n) \cdot [F]$$
$$+ V_B(N,n) \cdot [\bar{F}]$$

The resulting decoded signal is shown as a function of time in FIG. 5i.

The second video signal component, which is the desired one, is seen to be, for odd numbered frames, the sum of the second video signals corresponding to the preceding two frames, while for even numbered frames, it is the sum of the second video signals corresponding to the current and preceding frames, resulting in a repeat merged frame display of the second video source.

Figure 2:
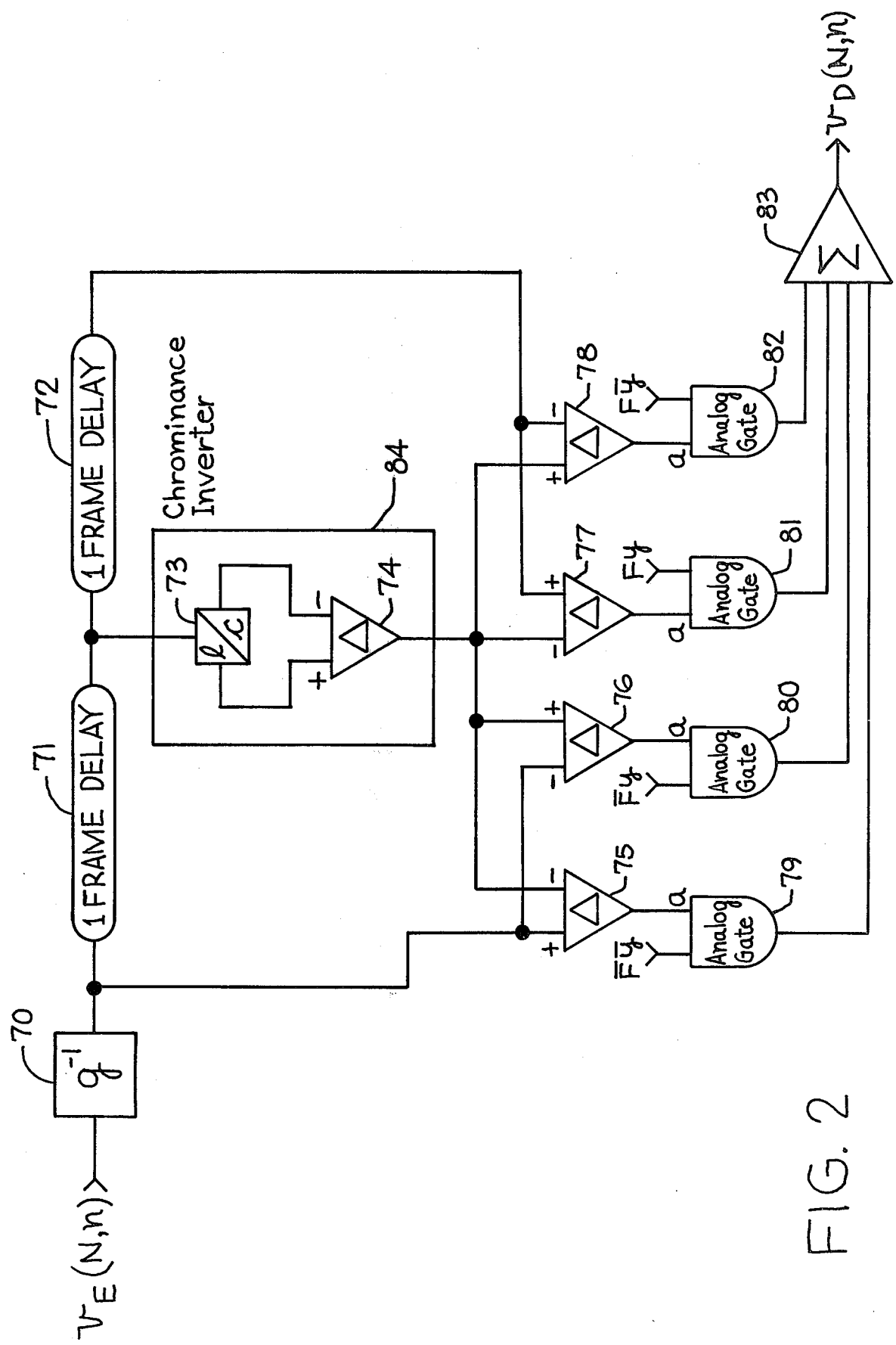
FIG. 2 is a block diagram of the video decoder utilized in the Repeat Merged Frame/Alternate Line method.

The decoder implementation is shown in FIG. 2. As shown therein, the composite video signal, $V_E(N,n)$, is applied to Amplifier 70, with transfer function $g^{-1}$, to provide a first component, $g^{-1}[V_E(N,n)]$. This component is also delayed for one frame time by Frame Delay Unit 71 to provide the signal, $g^{-1}[V_E(N-1,n)]$, which is applied to Chrominance Inverter 84 and Frame Delay Unit 72. The output signal of Chrominance Inverter 84 provides a second component, $g^{-1}[V_E^*(N-1,n)]$, and the output of Frame Delay Unit 72 provides a third component, $g^{-1}[V_E(N-2,n)]$. Four algebraic difference signals are formed by the Analog Difference Amplifiers 75, 76, 77 and 78 where the first difference between the third component and the second component, $g[V_E(N-2,n)] - g^{-1}[V_E^*(N-1,n)]$, is formed by Analog Difference Amplifier 77; the second difference, between the second component and the third component, $g^{-1}[V_E^*(N-1,n)] - g^{-1}[V_E(N-2,n)]$, is formed by Analog Difference Amplifier 78; the third difference, between the second component and the first component, $g^{-1}[V_E^*(N-1,n)] - g^{-1}[V_E(N,n)]$, is formed by Analog Difference Amplifier 76; and the fourth difference, between the first component and the second component, $g^{-1}[V_E(N,n)] - g^{-1}[V_E^*(N-1,n)]$, is formed by Analog Difference Amplifier 75. These four difference signals are time multiplexed by their associated Analog Gates, as shown, into Analog Summing Amplifier 83 to yield the video signal, $V_D(N,n)$, corresponding to the decoding function described by equation (2). The gating signals, Fy, $\overline{Fy}$, $F\bar{y}$ and $\overline{F\bar{y}}$, provide the appropriate time multiplexing.

II. THE REPEAT MERGED FIELD METHOD (a) Encoding

The first video signal component is formed, during an odd numbered field, by summing the first video signal, amplitude scaled by a first factor, h, corresponding to the current field, and the similarly scaled first video signal corresponding to the preceding field to form a merged field, while during the succeeding even numbered field, this previously formed merged field is repeated.

The second video signal component is formed, by scaling the amplitude of the second video signal by a second scaling factor, g, which is smaller than the first factor, and then alternating the polarity of the resultant at the field rate.

The encoded video signal comprises the video sum of the first and second video signal components.

The encoding function for the Repeat Merged Field Method may be written as:

$$V_E(N,n) = [h[V_A(N,n)] + h[V_A(N-1,n+1)]] \cdot f \qquad (4)$$
$$+ [h[V_A(N,n+1)] + h[V_A(N-1,n+2)]] \cdot \bar{f}$$
$$+ g[V_B(N,n)] \cdot f$$
$$- g[V_B(N,n)] \cdot \bar{f}$$

The resulting encoded signal is shown as a function of time in FIG. 5j.

Figure 3:
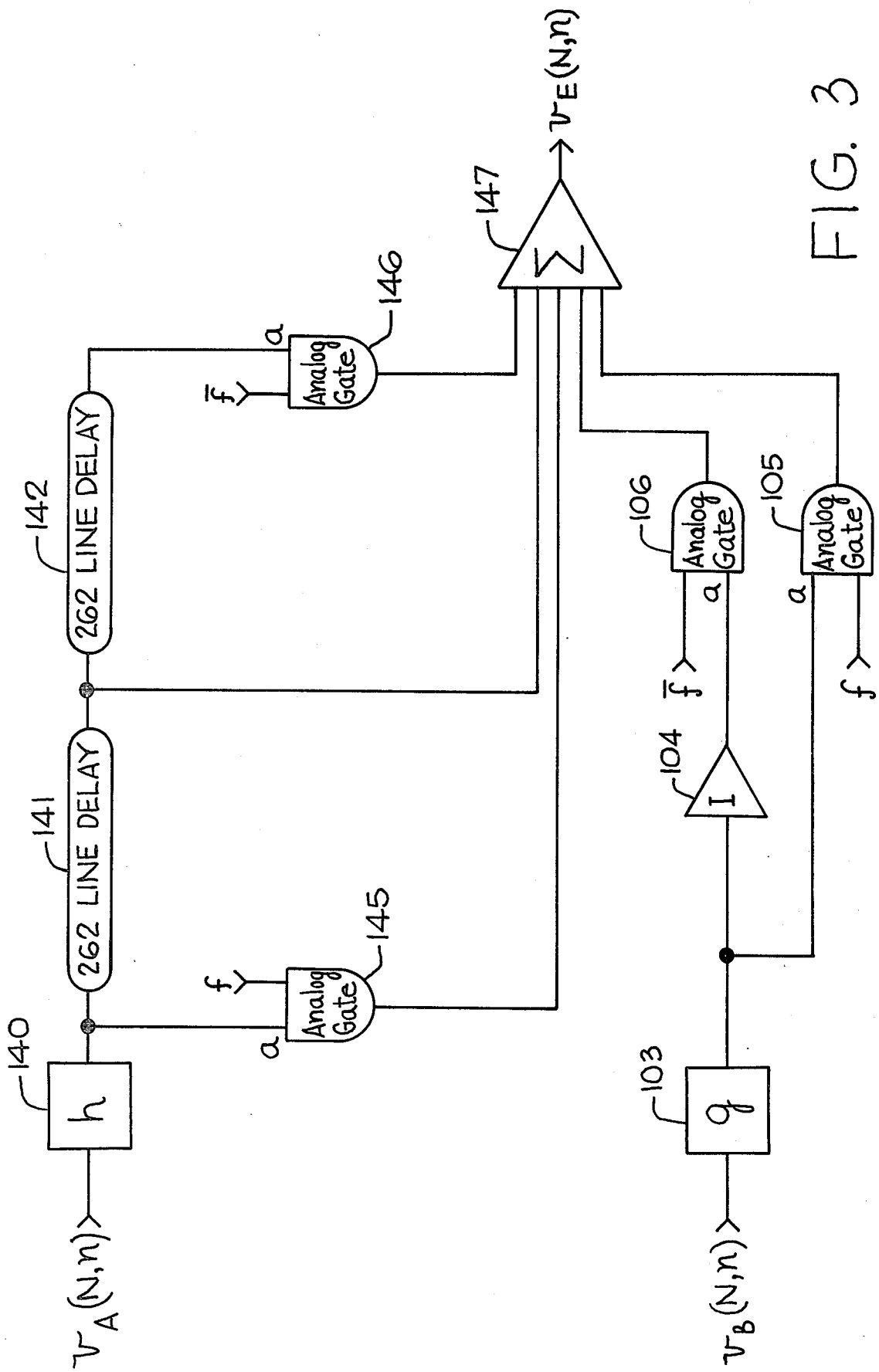
FIG. 3 is a block diagram of the video encoder utilized in the Repeat Merged Field Model.

The encoder implementation is shown in FIG. 3. As shown therein, the first video signal, $V_A(N,n)$, is applied to Attenuator 140 with transfer function, h, to provide a first component, $h[V_A(N,n)]$. This component is also delayed for 262 line times by Delay Unit 141 to provide a second component, $h[V_A(N-1,n+1)]f+h[V_A(N,n+1)]\bar{f}$ which is also applied to 262 line Delay Unit 142.

The output of 262 line Delay Unit 142 provides a second component, $h[V_A(N-1,n+2)]$.

The first and second components are time multiplexed by their associated Analog Gates 145 and 146, under control of signals f and $\bar{f}$, respectively, into Analog Summing Amplifier 147. It is the sum of these two components that comprise the first video component of the encoded video signal. The second video signal, $V_B(N,n)$, is applied to Attenuator 103 with transfer function, g, to provide the signal $g[V_B(N,n)]$. The resulting signal, $g[V_B(N,n)]$, is applied to Video Inverter 104, to provide its inverse signal $-g[V_B(N,n)]$. These latter two signals are then gated by Analog Gates 106 and 105 (the analog input is denoted by "a"), to provide the requisite alternating polarity signal, comprising the second component of the encoded video signal, to Analog Summing Amplifier 102. The gating signals, f and $\bar{f}$ provide the polarity switching function.

The output of Analog Summing Amplifier 147 is the encoded video signal corresponding to the encoding function described by equation (4).

A standard television receiver, or the standard video channel of a non-standard receiver, receiving this encoded composite video signal, will render the imagery corresponding essentially to the first video signal.

(b) Decoding

The second video signal is extracted from the encoded composite video signal by forming, during an even numbered field, the difference between the currently arriving encoded video signal, scaled by the scaling inverse of the encoder's second scaling factor, $g^{-1}$, and the similarly scaled encoded video signal which arrived 262 lines earlier, and during the ensuing odd numbered field, repeating this previously formed difference signal.

The decoding function may be written as:

$$V_D(N,n) = [g^{-1}[V_E(N-1,n+2] - \qquad (5)$$
$$g^{-1}[V_E(N-1,n+1)]] \cdot f$$
$$+ [g^{-1}[V_E(N,n+1)] - g^{-1}[V_E(N,n)]] \cdot \bar{f}$$

The resulting video signal that is displayed on a non-standard television receiver is found by performing the specified decoding function on the encoded video signal. The result may be expressed as:

$$V_D(N,n) = [V_B(N-1,n+2) + V_B(N-1,n+1)] \cdot f$$
$$+ [V_B(N,n+1) + V_B(N,n)] \cdot \bar{f}$$

The resulting decoded signal is shown as a function of time in FIG. 5k.

Figure 4:
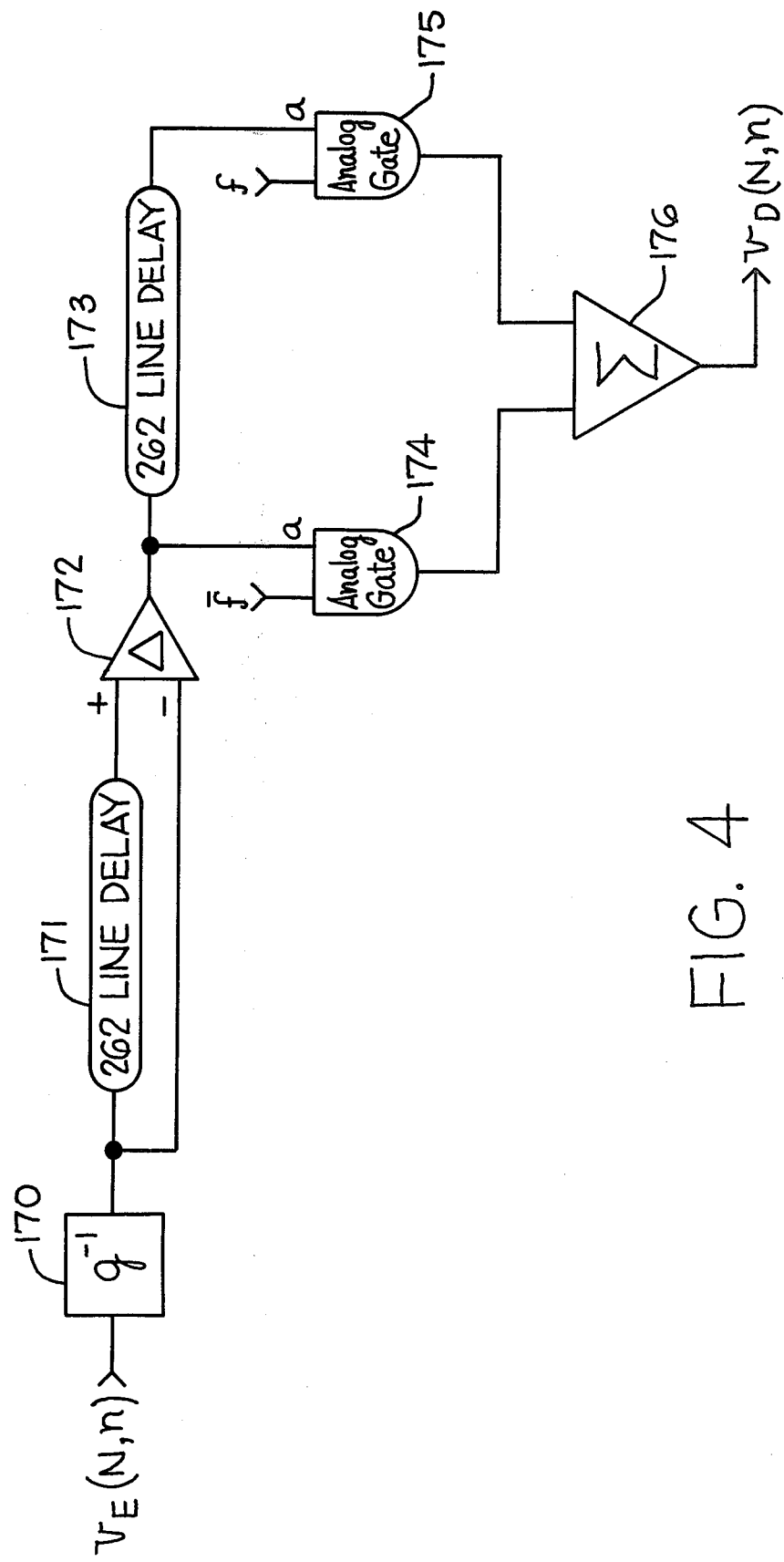
FIG. 4 is a block diagram of the video decoder utilized in the Repeat Merged Field Method.

The decoder implementation is shown in FIG. 4. As shown therein, the composite video signal, $V_E(N,n)$, is applied to Amplifier 170, with transfer function $g^{-1}$, to provide a first component, $g^{-1}[V_E(N,n)]$, which is applied to Analog Difference Amplifier 173. This component is also delayed for 262 line times by Delay Unit 171 to provide the signal, $g^{-1}[V_E(N-1,n+1)] \cdot f + g^{-1}[V_E(N,n+1)] \cdot \bar{f}$, which is also applied to Analog Difference Amplifier 173.

The output signal of Analog Difference Amplifier 173 provides a first component, $g^{-1}[V_E(N-1,n+1)]f + g^{-1}[V_E(N,n+1)]\bar{f} - g^{-1}[V_E(N,n)]$. This signal is applied to 262 line Delay Unit 172 to provide a second component, $g^{-1}[V_E(N-1,n+2)] - g^{-1}[V_E(N-1,n+1)]f - g^{-1}[V_E(N,n+1)]\bar{f}$.

These two components are time multiplexed by their associated Analog Gates 174 and 175 as shown, into Analog Summing Amplifier 176 to yield the video signal, $V_D(N,n)$, corresponding to the decoding function described by equation (5). The gating signals f and $\bar{f}$ provide the appropriate time multiplexing.

A variant of the Repeat Merged Field Method, replaces the f and f gating signals applied to Analog Gates 105 and 106 shown in FIG. 3 and $F \oplus f \oplus y$ and $\overline{F \oplus f \oplus y}$, respectively, to alternate the polarity of the amplitude scaled second video signal at the line rate rather than the field rate. In addition, the Analog Difference Amplifier shown in FIG. 4 is replaced by an Absolute Difference Amplifier, or functional equivalent.

Although not specifically indicated, the recovered composite video signal, representing the imagery of the first video source, and the decoded video signal, representing the imagery of the second video source, are each processed by conventional luminance and chrominance circuitry to provide the Y, (R-Y), (G-Y) and (B-Y) signals as required by a three gun (or equivalent) picture tube. The chrominance circuitry includes a chrominance demodulator.

As indicated in the exemplary encoder, and decoder embodiments, the function of the Chrominance Inverter is to correct the phase of the delayed (by an odd number of television lines) video signal relative to the chrominance subcarrier reference signal.

The equivalent function may be performed by alternating, at the applicable rate and time, the polarity of the chrominance subcarrier reference signal as applied to the chrominance demodulator, thus permitting the deletion of the Chrominance Inverter and associated circuitry from the exemplary decoder embodiments.

COMPONENT CONSIDERATIONS

The components used in the encoder decoder and converter embodiments all utilize conventional technologies, however, the currently emerging charge coupled device (CCD) technology may provide a significant cost and size advantage when applied to the Delay Units shown in the encoder and decoder embodiments.

Fairchild Camera and Instrument Corp. is currently developing a television field store device based on charge coupled device technology. The design objectives of this device are to provide storage capacity of 640×256 picture elements, corresponding to 163,840 analog "bits" at a maximum bit rate of 12 MHz, on a chip area of 170 mil×760 mil.

Although the invention has been described as applied to the NTSC system of television, it can, with suitable modification, be made to apply to other television systems such as, for example, modified NTSC (625 lines/50 fields), Phase Alternation Line (PAL) or Sequential with Memory (SECAM).

Similarly, although the invention has been described as applied to color television systems, it is also applicable to monochromatic television systems.

Accordingly, it is clear that the above description of the alternative and preferred embodiments in no way limits the scope of the present invention which is defined by the following claims.

What is claimed is:

1. A television system comprising:
   (a) means for providing a first video signal;
   (b) means for providing a second video signal in time synchronism with said first video signal;
   (c) encoding means for forming a composite video signal of said first video signal and said second video signal, said encoding means including:
      (1) means for scaling the amplitude of said first video signal by a first factor;
      (2) means for scaling the amplitude of said second video signal by a second factor;
      (3) means for alternating the polarity of said scaled second video signal at the line rate;
      (4) first means for delaying said scaled first video signal for one frame time;
      (5) second means for delaying said delayed first video signal for one frame time;
      (6) means for correcting the chrominance phase of said one frame delayed first video signal relative to the chrominance subcarrier reference signal;
      (7) multiplexing means for generating a multiplexed first video signal, said multiplexing means including means for time multiplexing said amplitude scaled first video signal and said two frame delayed first video signal such that said amplitude scaled first video signal is passed during odd numbered frames and said two frame delayed first video signal is passed during even numbered frames; and
      (8) means for summing said multiplexed first video signal, said chrominance phase corrected video signal and said alternating polarity second video signal to form said composite video signal;
   (d) means for transmitting said composite video signal to means for receiving said composite video signal, said receiving means including:
      (1) means for recovering said composite video signal from said received composite video signal; and
      (2) means for decoding said second video signal from said received composite video signal, said decoding means including:
         (a) means for scaling the amplitude of said received composite video signal by the scaling inverse of said second factor;
         (b) first means for delaying said scaled composite video signal for one frame time;
         (c) second means for delaying said delayed composite video signal for one frame time;
         (d) means for correcting the chrominance phase of said one frame delayed composite video signal relative to the chrominance subcarrier reference signal; and
         (e) means for forming, during even numbered frames, the absolute difference between said scaled composite video signal and said chrominance phase corrected video signal, and during odd numbered frames, the absolute difference between said chrominance phase corrected video signal and said two frame delayed composite video signal, to recover said second video signal.

2. A television system as recited in claim 1 further including means for displaying said composite video signal to render the imagery corresponding to said first video signal.

3. A television system as recited in claim 1 further including means for displaying said decoded second video signal to render the imagery corresponding to said second video signal.

4. A television system as recited in claim 1 further including means for displaying:
   (a) said composite video signal to render the imagery corresponding to said first video signal; and
   (b) said decoded second video signal to render the imagery corresponding to said second video signal.

5. A television system as recited in claim 4 wherein said first video signal and said second video signal comprise a stereoscopic pair.

6. A television system as recited in claim 5 wherein said displaying means includes means for converting said composite video signal and said decoded second video signal into a time multiplexed video signal for time sequential stereoscopic presentation on a single display device.

7. A television system as recited in claim 6 wherein said single display device comprises a cathode ray tube.

8. A television system comprising:
   (a) means for providing a first video signal;
   (b) means for providing a second video signal in time synchronism with said first video signal;
   (c) encoding means for forming a composite video signal of said first video signal and said second video signal, said encoding means including:
      (1) means for scaling the amplitude of said first video signal by a first factor;
      (2) means for scaling the amplitude of said second video signal by a second factor;
      (3) means for alternating the polarity of said scaled second video signal at the field rate;
      (4) first means for delaying said scaled first video signal for one field less one half line time;
      (5) second means for delaying said delayed first video signal for one field less one half line time;
      (6) multiplexing means for generating a multiplexed first video signal, said multiplexing means including means for time multiplexed said amplitude scaled first video signal and said twice delayed first video signal such that said amplitude scaled first video signal is passed during odd numbered fields and said twice delayed first video signal is passed during even numbered fields; and
      (7) means for summing said multiplexed first video signal, said once delayed first video signal and said alternating polarity second video signal to form said composite video signal;

(d) means for transmitting said composite video signal to means for receiving said composite video signal, said receiving means including:
  (1) means for recovering said composite video signal from said received composite video signal; and
  (2) means for decoding said second video signal from said received composite video signal, said decoding means including:
    (a) means for scaling the amplitude of said received composite video signal by the scaling inverse of said second factor;
    (b) first means for delaying said scaled composite video signal for one field less one half line time;
    (c) means for forming the difference between said delayed video signal and said scaled composite video signal;
    (d) means for delaying said difference video signal for one field less one half line time; and
    (e) means for transferring during even numbered fields, said difference video signal, and during odd numbered fields, said delayed difference video signal, to recover said second video signal.

9. A television system as recited in claim 8 further including means for displaying said composite video signal to render the imagery corresponding to said first video signal.

10. A television system as recited in claim 8 further including means for displaying said decoded second video signal to render the imagery corresponding to said second video signal.

11. A television system as recited in claim 8 further including means for displaying:
  (a) said composite video signal to render the imagery corresponding to said first video signal; and
  (b) said decoded second video signal to render the imagery corresponding to said second video signal.

12. A television system as recited in claim 11 wherein said first video signal and said second video signal comprise a stereoscopic pair.

13. A television system as recited in claim 12 wherein said displaying means includes means for converting said composite video signal and said decoded second video signal into a time multiplexed video signal for time sequential stereoscopic presentation on a single display device.

14. A television system as recited in claim 13 wherein said single display device comprises a cathode ray tube.

15. A television system comprising:
  (a) means for providing a first video signal;
  (b) means for providing a second video signal in time synchronism with said first video signal;
  (c) encoding means for forming a composite video signal of said first video signal and said second video signal, said encoding means including:
    (1) means for scaling the amplitude of said first video signal by a first factor;
    (2) means for scaling the amplitude of said second video signal by a second factor;
    (3) means for alternating the polarity of said scaled second video signal at the line rate;
    (4) first means for delaying said scaled first video signal for one field less one half line time;
    (5) second means for delaying said delayed first video signal for one field less one half line time;
    (6) multiplexing means for generating a multiplexed first video signal, said multiplexed means including means for time multiplexing said amplitude scaled first video signal and said twice delayed first video signal such that said amplitude scaled first video signal is passed during odd numbered fields and said twice delayed first video signal is passed during even numbered fields; and
    (7) means for summing said multiplexed first video signal, said once delayed first video signal and said alternating polarity second video signal to form said composite video signal;
  (d) means for transmitting said composite video signal to means for receiving said composite video signal, said receiving means including:
    (1) means for recovering said composite video signal from said received composite video signal; and
    (2) means for decoding said second video signal from said received composite video signal, said decoding means including:
      (a) means for scaling the amplitude of said received composite video signal by the scaling inverse of said second factor;
      (b) first means for delaying said scaled composite video signal for one field less one half line time;
      (c) means for forming the absolute difference between said delayed video signal and said scaled composite video signal;
      (d) means for delaying said absolute difference video signal for one field less one half line time; and
      (e) means for transferring, during even numbered fields said absolute difference video signal, and during odd numbered fields, said delayed absolute difference video signal, to recover said second video signal.

16. A television system as recited in claim 15 further including means for displaying said composite video signal to render the imagery corresponding to said first video signal.

17. A television system as recited in claim 15 further including means for displaying said decoded second video signal to render the imagery corresponding to said second video signal.

18. A television system as recited in claim 15 further including means for displaying:
  (a) said composite video signal to render the imagery corresponding to said first video signal; and
  (b) said decoded second video signal to render the imagery corresponding to said second video signal.

19. A television system as recited in claim 18 wherein said first video signal and said second video signal comprise a stereoscopic pair.

20. A television system as recited in claim 19 wherein said displaying means includes means for converting said composite video signal and said decoded second video signal into a time multiplexed video signal for time sequential stereoscopic presentation on a single display device.

21. A television system as recited in claim 20 wherein said single display device comprises a cathode ray tube.

* * * * *